United States Patent
Kim et al.

(10) Patent No.: US 12,484,049 B2
(45) Date of Patent: Nov. 25, 2025

(54) UPLINK TRANSMISSION AND RECEPTION METHOD AND DEVICE IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 17/782,612

(22) PCT Filed: Jun. 24, 2021

(86) PCT No.: PCT/KR2021/007972
§ 371 (c)(1),
(2) Date: Jun. 3, 2022

(87) PCT Pub. No.: WO2022/005109
PCT Pub. Date: Jan. 6, 2022

(65) Prior Publication Data
US 2023/0023982 A1 Jan. 26, 2023

(30) Foreign Application Priority Data

Jun. 30, 2020 (KR) .................. 10-2020-0080606
Mar. 18, 2021 (KR) .................. 10-2021-0035420

(51) Int. Cl.
*H04W 72/1268* (2023.01)
*H04L 1/08* (2006.01)
*H04L 5/00* (2006.01)
*H04W 72/23* (2023.01)

(52) U.S. Cl.
CPC ........... *H04W 72/1268* (2013.01); *H04L 1/08* (2013.01); *H04L 5/0051* (2013.01); *H04W 72/23* (2023.01)

(58) Field of Classification Search
CPC ............. H04W 72/1268; H04W 72/23; H04W 52/0216; H04W 52/0245; H04L 1/08;
(Continued)

(56) References Cited

U.S. PATENT DOCUMENTS

2020/0382252 A1* 12/2020 Sun ................... H04B 7/0626
2021/0289525 A1* 9/2021 Khoshnevisan ........ H04L 1/189
(Continued)

FOREIGN PATENT DOCUMENTS

| WO | 2019/190236 A1 | 10/2019 |
| WO | 2020/056180 A1 | 3/2020 |
| WO | 2020/064727 A1 | 4/2020 |

OTHER PUBLICATIONS

Nokia et al., "Introduction of switched uplink operation", R1-2005120, 3GPP TSG RAN WG1 Meeting #101-e, e-Meeting, May 25-Jun. 5, 2020, see section 6.2.1.
(Continued)

*Primary Examiner* — Ashley Shivers
(74) *Attorney, Agent, or Firm* — BRYAN CAVE LEIGHTON PAISNER LLP

(57) ABSTRACT

An uplink transmission and reception method and device in wireless communication system are disclosed. A method by which a terminal performs uplink transmission in a wireless communication system, according to one embodiment of the present disclosure, may comprise the steps of: receiving configuration information related to a plurality of sounding reference signal (SRS) resource sets; receiving downlink control information (DCI), which indicates at least one from among a first SRS resource set, a second SRS resource set,
(Continued)

or the first SRS resource set and the second SRS resource set and includes information indicating at least one SRS resource in the indicated at least one SRS resource set; and performing the uplink transmission on the basis of the indicated at least one SRS resource.

13 Claims, 11 Drawing Sheets

(58) Field of Classification Search
CPC ..... H04L 5/0051; H04L 1/1896; H04L 1/189; H04L 27/2613; Y02D 30/70; H04B 7/024; H04B 7/0695; H04B 7/0456; H04B 7/0486
See application file for complete search history.

(56) References Cited

U.S. PATENT DOCUMENTS

| | | | |
|---|---|---|---|
| 2021/0367730 A1* | 11/2021 | Chen | H04L 5/0044 |
| 2022/0338220 A1* | 10/2022 | Jiang | H04L 1/08 |
| 2022/0394499 A1* | 12/2022 | Matsumura | H04L 5/0051 |
| 2023/0063015 A1* | 3/2023 | Muruganathan | H04L 5/0023 |

OTHER PUBLICATIONS

Lenovo et al., "Discussion on UL multi-panel transmission", R1-1906276, 3GPP TSG RAN WG1 Meeting #97, Reno, USA, May 13-17, 2019, see section 2.1.

* cited by examiner

UPLINK TRANSMISSION AND RECEPTION METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2021/007972, filed on Jun. 24, 2021, which claims the benefit of and priority to Korean Application No. 10-2020-0080606, filed on Jun. 30, 2020 and Korean Application No. 10-2021-0035420, filed on Mar. 18, 2021, the contents of which are all hereby incorporated by reference herein in their entirety.

TECHNICAL FIELD

The present disclosure relates to a wireless communication system, and in more detail, relates to an uplink transmission and reception method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide an uplink transmission/reception method and apparatus in a wireless communication system.

An additional technical object of the present disclosure is to provide an uplink transmission/reception method and apparatus based on at least one sounding reference signal resource set among a plurality of sounding reference signal resource sets in a wireless communication system.

The technical objects to be achieved by the present disclosure are not limited to the above-described technical objects, and other technical objects which are not described herein will be clearly understood by those skilled in the pertinent art from the following description.

Technical Solution

A method for a UE to perform uplink transmission in a wireless communication system according to an aspect of the present disclosure may include: receiving configuration information related to a plurality of sounding reference signal (SRS) resource sets; receiving downlink control information (DCI) including information indicating at least one of a first SRS resource set, a second SRS resource set, or the first SRS resource set and the second SRS resource set, and indicating at least one SRS resource in the indicated at least one SRS resource set; and performing the uplink transmission based on the indicated at least one SRS resource.

A method for a base station to perform uplink reception in a wireless communication system according to an additional aspect of the present disclosure may include: transmitting configuration information related to a plurality of sounding reference signal (SRS) resource sets; transmitting downlink control information (DCI) including information indicating at least one of a first SRS resource set, a second SRS resource set, or the first SRS resource set and the second SRS resource set, and indicating at least one SRS resource in the indicated at least one SRS resource set; and performing uplink reception transmitted based on the indicated at least one SRS resource.

Technical Effects

According to an embodiment of the present disclosure, an uplink transmission/reception method and apparatus may be provided in a wireless communication system.

According to an embodiment of the present disclosure, an uplink transmission/reception method and apparatus based on at least one sounding reference signal resource set among a plurality of sounding reference signal resource sets may be provided in a wireless communication system.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
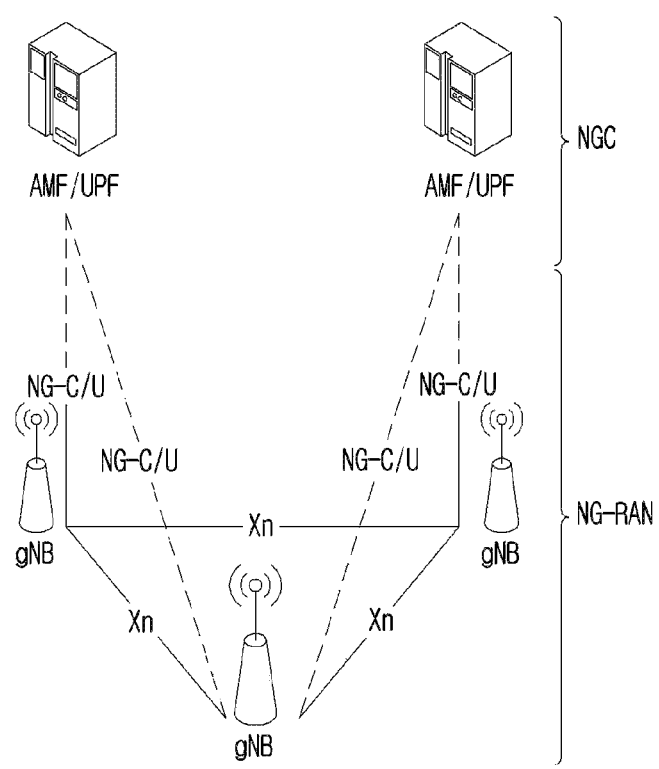
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
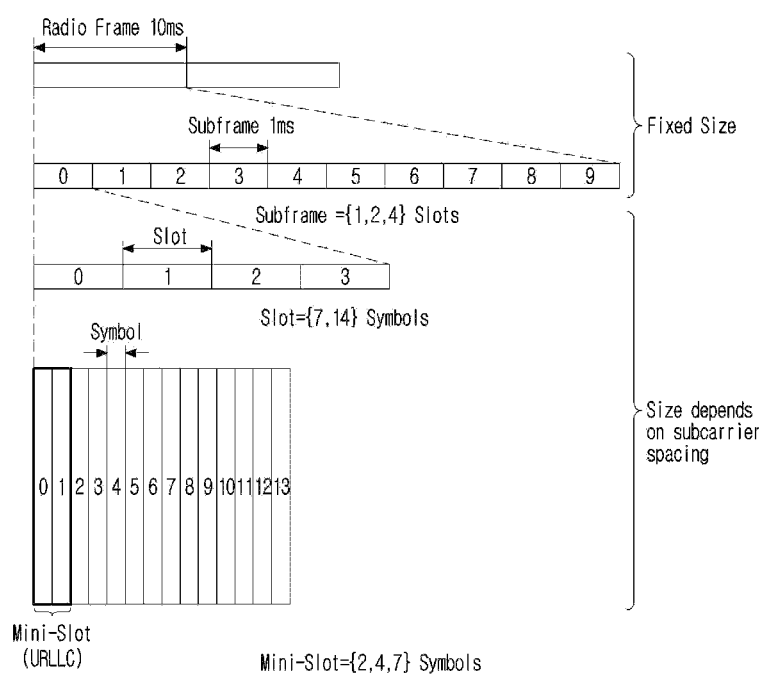
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480-103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $p=^2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
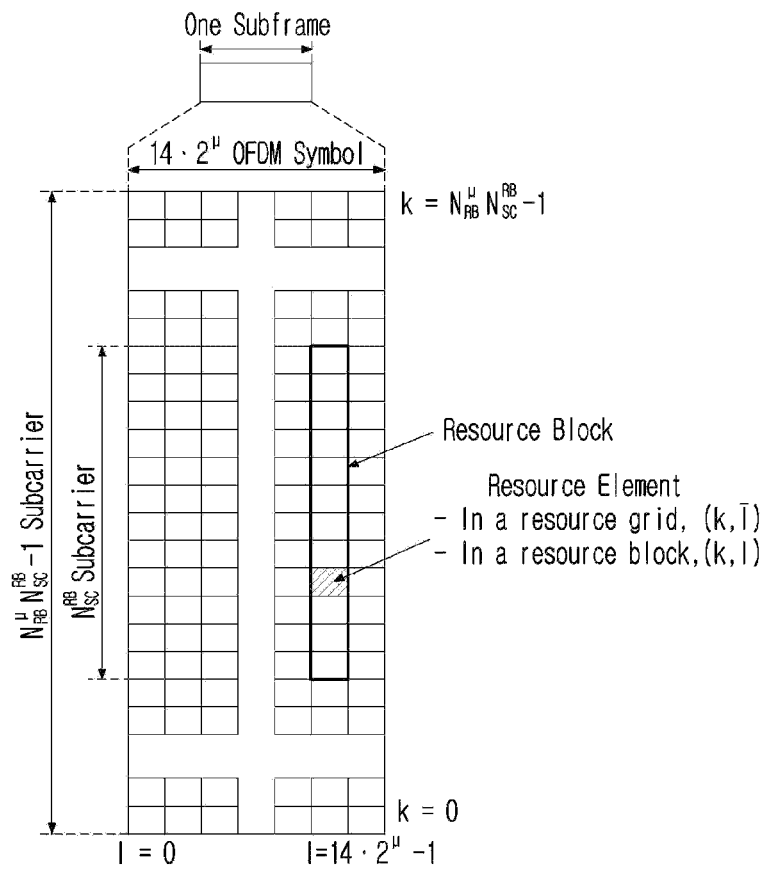
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration p is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
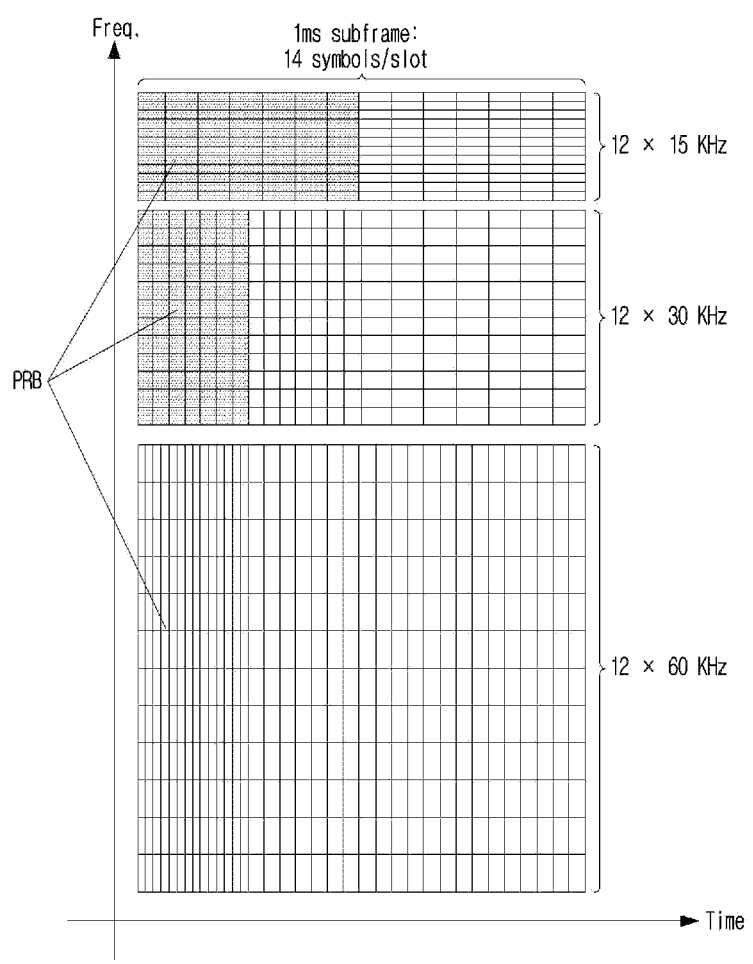
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
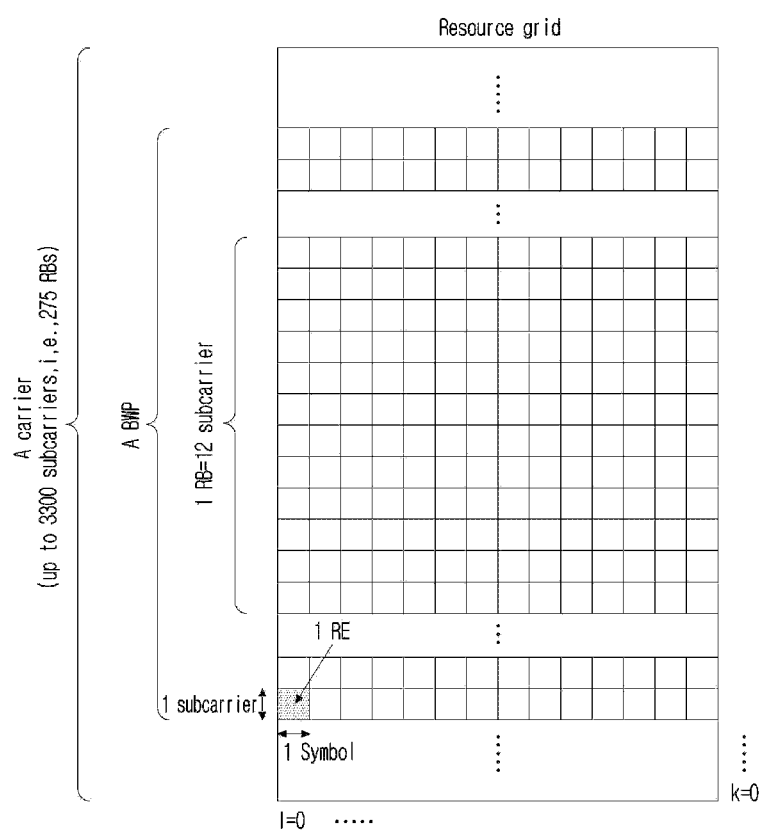
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
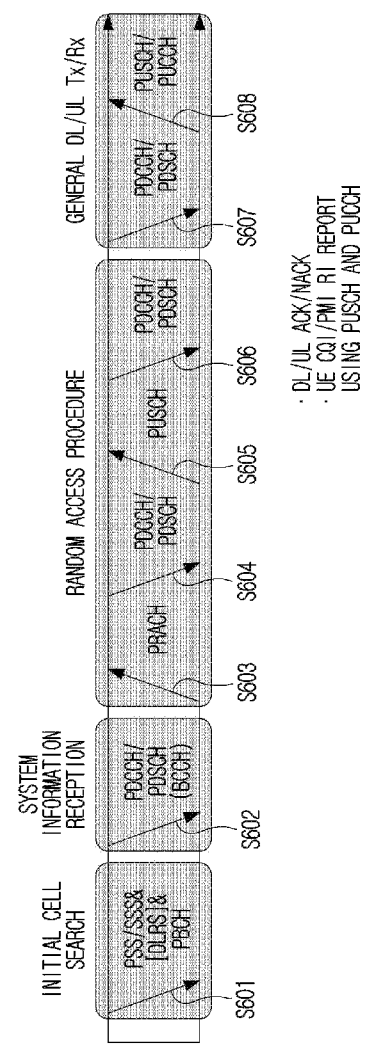
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement)

signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described. NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
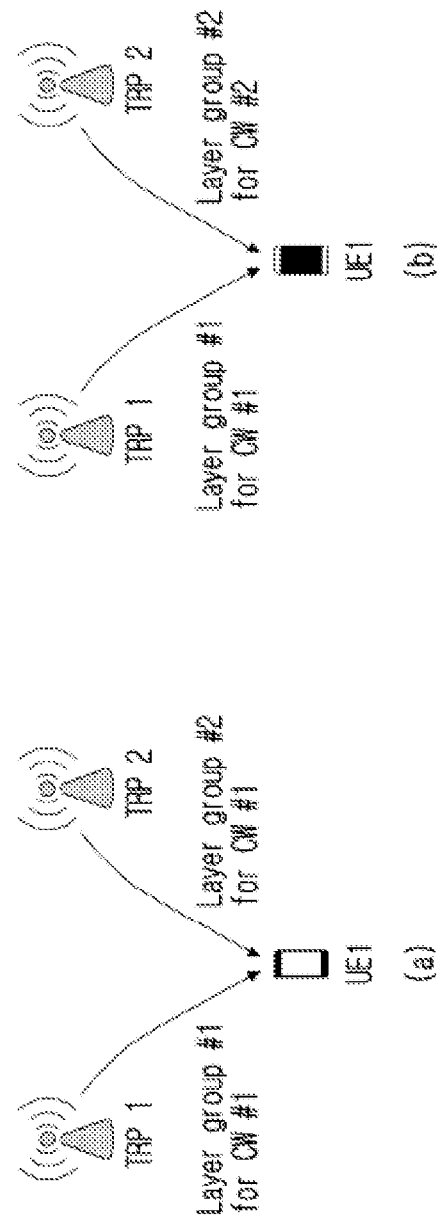
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.
  The same TB is transmitted in one layer or layer set at each transmission time (occasion) and each layer or each layer set is associated with one TCI and one set of DMRS port(s).
  A single codeword having one RV is used in all spatial layers or all layer sets. With regard to UE, different coded bits are mapped to a different layer or layer set by using the same mapping rule 1-b) Method 1b
  The same TB is transmitted in one layer or layer set at each transmission time (occasion) and each layer or each layer set is associated with one TCI and one set of DMRS port(s).
  A single codeword having one RV is used in each spatial layer or each layer set. RV(s) corresponding to each spatial layer or each layer set may be the same or different.

1-c) Method 1c
  The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot
  Each non-overlapping frequency resource allocation is associated with one TCI state.
  The same single/multiple DMRS port(s) are associated with all non-overlapping frequency resource allocation.

2-a) Method 2a
  A single codeword having one RV is used for all resource allocation. With regard to UE, common RB matching (mapping of a codeword to a layer) is applied to all resource allocation.

2-b) Method 2b
  A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot
  Each transmission time (occasion) of a TB has time granularity of a mini-slot and has one TCI and one RV.
  A common MCS is used with a single or multiple DMRS port(s) at all transmission time (occasion) in a slot.
  A RV/TCI may be the same or different at a different transmission time (occasion).

4) Method 4 (TDM): n (n<=Nt2) TCI States in K (n<=K) Different Slots
  Each transmission time (occasion) of a TB has one TCI and one RV.
  All transmission time (occasion) across K slots uses a common MCS with a single or multiple DMRS port(s).
  A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 and shares received data/DCI through a backhaul link connected between TRPs. UE configured with a UL MTRP-URLLC transmission method transmits the same data/UCI by using a different layer/time/frequency resource. Here, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and spatial relation information, etc. instead of a TCI state may be configured to UE through other parameter. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for an open loop parameter Po and an alpha (up to 32 parameter value sets per cell), q_d: an index of a DL RS resource for PL (pathloss) measurement (up to 4 measurement per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, whether of MTRP URLLC transmission/reception or MTRP eMBB transmission/reception may be understood by UE by separately dividing RNTI for MTRP-URLLC and RNTI for MTRP-eMBB and using them. In other words, when CRC masking of DCI is performed by using RNTI for URLLC, UE is considered as URLLC transmission and when CRC masking of DCI is performed by using RNTI for eMBB, UE is considered as eMBB transmission. Alternatively, a base station may configure MTRP URLLC transmission/reception to UE or may configure TRP eMBB transmission/reception through other new signaling.

In a description of the present disclosure, it is described by assuming cooperative transmission/reception between 2 TRPs for convenience of description, but a method suggested in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Embodiments of the present disclosure described below may be utilized in a situation in which MTRP cooperatively transmits a PDCCH (e.g., the same PDCCH is repeatedly transmitted or transmitted separately), and some embodiments may also be utilized in a situation in which MTRP cooperatively transmits a PDSCH or cooperatively receives a PUSCH/PUCCH.

In addition, in describing the present disclosure, the meaning that a plurality of base stations (i.e., MTRP) repeatedly transmits the same PDCCH may mean that the same DCI is transmitted through a plurality of PDCCH candidates, and the plurality of base stations transmit the same DCI may mean that it has been repeatedly transmitted. The same DCI may mean two DCIs having the same DCI format/size/payload. Alternatively, even if the payloads of the two DCIs are different, if the scheduling result is the same, it may be said that the two DCIs are the same DCI. For example, the time domain resource allocation (TDRA) field of DCI relatively determines a slot/symbol position of data and a slot/symbol position of A/N based on a DCI reception time. In this case, when the DCI received at time n and the DCI received at time n+1 inform the UE of the same scheduling result, the TDRA fields of the two DCIs are different, and consequently, the DCI payload is inevitably different. The number of repetitions R may be directly instructed by the base station to the terminal or may be mutually promised. Alternatively, even if the payloads of the two DCIs are different and the scheduling results are not the same, if the scheduling result of one DCI is a subset of the scheduling result of the other DCI, it may be said to be the same DCI. For example, when the same data is TDM and repeatedly transmitted N times, DCI 1 received before the first data indicates repetition of data N times, and DCI 2 received after the first data and before the second data indicates N−1 data repetition. The scheduling data of DCI 2 is a subset of the scheduling data of DCI 1, and since both DCIs are scheduling for the same data, in this case, it may also be referred to as the same DCI.

In addition, in describing the present disclosure below, transmission of the same PDCCH by multiple base stations may mean that one DCI is transmitted through one PDCCH candidate, but TRP 1 transmits some resources in which the PDCCH candidate is defined, and TRP 2 divides and transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits PDCCH candidate 1 and TRP 2 transmits PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

Additionally, when the same DCI is divided and transmitted to several PDCCH candidates, there may be two implementation methods.

The first implementation method is a method in which DCI payload (control information bits+CRC) is encoded through one channel encoder (e.g., polar encoder), and the resulting coded bits are divided and transmitted by two TRPs. In this case, the entire DCI payload may be encoded in the coded bits transmitted by each TRP, or only some DCI payloads may be encoded. The second method divides the DCI payload (control information bits+CRC) into two (DCI 1 and DCI 2) and encodes each through a channel encoder (e.g., a polar encoder). After that, the two TRPs transmit coded bits corresponding to DCI 1 and coded bits corresponding to DCI 2, respectively.

In summary, multiple base stations (MTRPs) dividing/repeating the same PDCCH to transmit across multiple MOs may mean that 1) the coded DCI bits encoding the entire DCI content of the corresponding PDCCH are repeatedly transmitted through each MO for each base station (STRP), 2) the coded DCI bits encoding the entire DCI content of the corresponding PDCCH are divided into a plurality of parts, and different parts are transmitted for each base station (STRP) through each MO, or 3) the DCI content of the corresponding PDCCH is divided into a plurality of parts, different parts are separately encoded for each base station (STRP), and transmitted through each MO.

Repeatedly or divided transmission of the PDCCH may be understood to mean that the PDCCH is transmitted multiple times over several transmission occasions (TOs), and TO means a specific time/frequency resource unit in which the PDCCH is transmitted. For example, if the PDCCH is transmitted multiple times (to a specific RB) over slots 1, 2, 3, and 4, TO may mean each slot, if the PDCCH is transmitted multiple times (in a specific slot) over RB sets 1, 2, 3, and 4, TO may mean each RB set, or if the PDCCH is transmitted multiple times over different times and frequencies, TO may mean each time/frequency resource. In addition, a TCI state used for DMRS channel estimation may be set differently for each TO, and it may be assumed that a TO with a different TCI state is transmitted by different TRP/panel. A plurality of base stations repeatedly transmitting or dividing the PDCCH to transmit may mean that a PDCCH is transmitted across multiple TOs, and the union of the TCI states established in those TOs consists of two or more TCI states. For example, when the PDCCH is transmitted over TO 1, 2, 3, 4, TCI states 1, 2, 3, 4 may be configured in each of TO 1, 2, 3, 4, which means that TRP i cooperatively transmits PDCCH in TO i.

In addition, in describing the present disclosure below, the UE repeatedly transmitting the same PUSCH so that multiple base stations (i.e., MTRPs) receive it may mean that the same data is transmitted through a plurality of PUSCHs, and each PUSCH may be optimized and transmitted for uplink channels of different TRPs. For example, the UE may repeatedly transmit the same data through PUSCH 1 and 2, and the UE may transmit PUSCH 1 using UL TCI state 1 for TRP 1, and the UE may receive and transmit a value optimized for a channel of TRP 1 for link adaptation such as precoder/MCS as well. The UE may transmit PUSCH 2 by using UL TCI state 2 for TRP 2, and the UE may transmit by scheduling a value optimized for the channel of TRP 2 for link adaptation such as precoder/MCS. In this case, repeatedly transmitted PUSCHs 1 and 2 may be transmitted at different times to be TDM, FDM, or SDM.

In addition, in describing the present disclosure below, the UE dividing and transmitting the same PUSCH so that multiple base stations (i.e., MTRP) may receive it may mean that one data is transmitted through one PUSCH, but the resources allocated to the PUSCH are split and optimized for UL channels of different TRPs for transmission. For example, the UE may transmit the same data through 10 symbol PUSCH, and may transmit the first 5 symbols using UL TCI state 1 for TRP 1, and may receive and transmit a value optimized for link adaptation such as precoder/MCS and TRP 1 channel. The UE may transmit the remaining 5 symbols using UL TCI state 2 for TRP 2, and the UE may receive and transmit a value optimized for the channel of TRP 2 in link adaptation such as precoder/MCS. In the above example, one PUSCH may be divided into time resources to perform TDM transmission for TRP 1 and TRP 2, but it may be transmitted using FDM/SDM.

Similar to PUSCH transmission, the PUCCH may also be transmitted by the UE repeatedly transmitting the same PUCCH or dividing the same PUCCH to be received by a plurality of base stations (i.e., MTRP).

The proposal of the present disclosure may be extended and applied to various channels such as PUSCH/PUCCH/PDSCH/PDCCH.

The proposal of the present disclosure may be extended and applied to both the case of repeatedly transmitting the channel on different time/frequency/spatial resources and the case of transmitting the channel separately.

Sounding Reference Signal (SRS)

In Rel-15 NR, spatialRelationInfo may be used to indicate a transmission beam which will be used when a base station transmits an UL channel to a terminal. A base station may indicate which UL transmission beam will be used when transmitting a PUCCH and a SRS by configuring a DL reference signal (e.g., a SSB-RI (SB Resource Indicator), a CRI (CSI-RS Resource Indicator) (P/SP/AP: periodic/semi-persistent/aperiodic)) or a SRS (i.e., a SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through a SRI field and used as a PUSCH transmission team of a terminal.

Hereinafter, a SRS for a codebook (CB) and a non-codebook (NCB) is described.

First, for a CB UL, a base station may first configure and/or indicate transmission of a SRS resource set for 'a CB' to a terminal. In addition, a terminal may transmit any n port SRS resource in a corresponding SRS resource set. A base station may receive a UL channel based on transmission of a corresponding SRS and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of a SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS connected with a corresponding SRS resource set. Subsequently, a base station may indicate a PUSCH (transmission) beam of a terminal and an UL rank and an UL precoder at the same time by indicating part of SRS resources for 'a non-CB' which is previously transmitted by a terminal through a SRI field of DCI when performing PUSCH scheduling through UL DCI. Thereby, a terminal may perform PUSCH transmission according to a corresponding indication.

Hereinafter, a SRS for beam management is described.

A SRS may be used for beam management. Specifically, UL BM may be performed by beamformed UL SRS transmission. Whether UL BM of a SRS resource set is applied (a higher layer parameter) is configured by 'usage'. When usage is configured as 'BeamManagement (BM)', only one SRS resource may be transmitted to each of a plurality of SRS resource sets in a given time instant. A terminal may be configured with at least one Sounding Reference Symbol (SRS) resource set configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resources'). In this case, K is a natural number and the maximum value of K is indicated by SRS_capability.

Hereinafter, a SRS for antenna switching is described.

A SRS may be used to acquire DL CSI (Channel State Information) information (e.g., DL CSI acquisition). As a specific example, a BS (Base station) may measure a SRS from UE after scheduling transmission of a SRS to UE (User Equipment) in a single cell or in multi cells (e.g., carrier aggregation (CA)) based on TDD. Here, a base station may perform scheduling of a DL signal/channel to UE based on measurement by a SRS by assuming DL/UL reciprocity. Here, regarding SRS based DL CSI acquisition, a SRS may be configured as usage of antenna switching.

In an example, when standards (e.g., 3gpp TS38.214) are followed, usage of a SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Meanwhile, in the examples of the present disclosure, the reference signal RS (e.g. CSI-RS, SRS, etc.) is used as a term including not only a predefined RS but also various physical layer signals/channels such as a synchronization signal or an SS/PBCH block. Also, the RS resource may be understood as a unit for distinguishing RS characteristics. For example, the first SRS resource and the second SRS resource may correspond to SRSs that are distinguished in terms of configuration parameters such as time/frequency/space/sequence. Similarly, the first CSI-RS resource and the second CSI-RS resource may correspond to distinct CSI-RSs in terms of configuration parameters such as time/frequency/space/sequence. Therefore, the configuration of the RS resource may mean that a specific parameter configured for the corresponding RS is configured, and transmission/reception through RS resource (or transmission/reception of RS resource) may mean that RS is transmitted/received based on a parameter of a configured RS resource.

In addition, in the examples of the present disclosure, for clarity of explanation, it is assumed that one or a plurality of 1-port SRS resource(s) are configured/transmitted in SRS configuration and transmission, but the scope of the present disclosure is not limited thereto. That is, in the following description, it is assumed that one SRS port is configured/transmitted and one or more of these SRS resources are configured/transmitted through one SRS resource, but one or more SRS ports are configured/transmitted through one SRS resource and examples of the present disclosure may be applied even when one or more of these SRS resources are configured/transmitted. For example, when configuration and transmission of a plurality of SRS ports per SRS resource is supported, in the following description, 'SRS resource' may be replaced with 'SRS port', and 'N SRS resources' may be replaced with 'N SRS ports', and these N SRS ports may be configured/transmitted through one or a plurality of SRS resources. For example, when N=4, it may be one 4-port SRS resource (i.e., 4 SRS ports are configured/transmitted through one SRS resource), or one 2-port SRS resource and one additional 2-port SRS resource (i.e., the first and second SRS ports are configured/transmitted through the first SRS resource, and the third and fourth SRS ports are configured/transmitted through the second SRS resource). For example, when N=3, one 2-port SRS resource and one 1-port SRS resource (i.e., the first and second SRS ports are configured/transmitted through the first SRS resource, and the third SRS port may be configured/transmitted through the second SRS resource).

In addition, in the following description, uplink transmission will be described assuming PUSCH transmission, but examples of the present disclosure may also be applied to transmission of various uplink channels/signals (e.g., PUCCH, SRS, or PRACH, etc.) other than PUSCH.

Uplink Transmission Based on Configuration of a Plurality of Sounding Reference Signal Resource Sets The present disclosure relates to a method for the UE to perform uplink transmission based on one or more SRS resource sets among a plurality of configured SRS resource sets based on a plurality of sounding reference signal (SRS) resource sets configured for the UE.

Although this disclosure mainly describes non-codebook-based uplink transmission as a representative example, the scope of the present disclosure is not limited thereto, and examples of the present disclosure may also be applied to codebook-based uplink transmission. That is, the scope of the present disclosure includes various uplink transmission schemes based on a plurality of SRS resource sets configured for a UE.

In addition, in the following description, one SRS resource set corresponds to one TRP for clarity, but the scope of the present disclosure is not limited thereto, one SRS resource set includes all transmission/reception schemes based on other corresponding units. For example, in the examples of the present disclosure, one TRP may correspond to a unit of one or more control resource sets (CORESET). For example, the first TRP may correspond to a first CORESET pool (or CORESET group/set), and the second TRP may correspond to a second CORESET pool (or CORESET group/set). In addition, in the examples of the present disclosure, one SRS resource set may correspond to one associated (NZP) CSI-RS resource. For example, the first SRS resource set and the first associated CSI-RS resource may correspond to each other, and the second SRS resource set and the second associated CSI-RS resource may correspond to each other.

Hereinafter, a method for the UE to perform uplink transmission based on one or more SRS resource sets among a plurality of SRS resource sets will be described with reference to FIG. 8.

Figure 8:
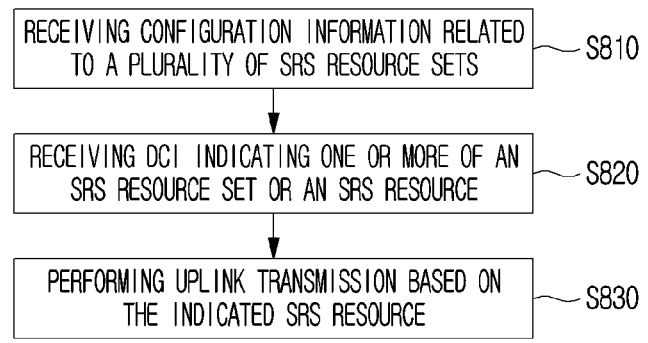
FIG. 8 is a diagram for describing an uplink transmission method of a terminal according to an embodiment of the present disclosure.

FIG. 8 is a flowchart illustrating an uplink transmission method of a UE in a wireless communication system to which the present disclosure may be applied.

In step S810, the UE may receive configuration information related to a plurality of SRS resource sets from the base station.

For example, configuration information related to a plurality of SRS resource sets may be configured based on 'SRS-ResourceSet', which is a higher layer parameter, and an exemplary configuration of one 'SRS-ResourceSet' may be as shown in Table 6 below.

TABLE 6

SRS-ResourceSet ::=            SEQUENCE {
    srs-ResourceSetId              SRS-ResourceSetId,
    srs-ResourceIdList                 SEQUENCE (SIZE (1 .. maxNrofSRS-ResourcesPerSet) ) OF
    SRS-ResourceId      OPTIONAL, -- Cond Setup TABLE 6-continued

```
resourceType                              CHOICE {
    aperiodic                             SEQUENCE {
        aperiodicSRS-ResourceTrigger          INTEGER (1 . . maxNrofSRS-TriggerStates-1),
        csi-RS                                                 NZP-CSI-RS-ResourceId
OPTIONAL, -- Cond NonCodebook
        slotOffset                                             INTEGER (1. . 32)
OPTIONAL, -- Need S
        . . . ,
        [ [
        aperiodicSRS-ResourceTriggerList-vl530    SEQUENCE {SIZE(1 . . maxNrofSRS-
TriggerStates-2))
                                          OF INTEGER (1 . . maxNrofSRS-TriggerStates-1)
OPTIONAL -- Need M
        ] ]
    },
    semi-persistent                       SEQUENCE {
        associatedCSI-RS                                       NZP-CSI-RS-ResourceId
OPTIONAL,    Cond NonCodebook
        . . .
    },
    periodic                              SEQUENCE {
        associatedCSI-RS                                       NZP-CSI-RS-ResourceId
OPTIONAL, -- Cond NonCodebook
        . . .
        }
    },
    usage                                 ENUMERATED {beamManagement, codebook, nonCodebook,
antennaSwitching},
    alpha                                                                          Alpha
OPTIONAL, -- Need S
    p0                                                         INTEGER (-202 . . 24)
OPTIONAL, -- Cond Setup
    pathlossReferenceRS                   CHOICE {
        ssb-Index                             SSB-Index,
        csi-RS-Index                          NZP-CSI-RS-ResourceID
    }
OPTIONAL,    Need M
    srs-PowerControlAdjustment States         ENUMERATED (sameAsFci2, separateClosedLoop}
OPTIONAL,    Need S
    . . . }
```

Specifically, configuration information related to a plurality of SRS resource sets may include information for configuring each usage of a plurality of SRS resource sets as a codebook, non-codebook, or other use (e.g., beam management, antenna switching, etc.).

In addition, information related to the plurality of SRS resource sets may include information for configuring an SRS resource set to be used for uplink transmission among the plurality of SRS resource sets. For example, the configuration information related to the plurality of SRS resource sets may include information for configuring a first SRS resource set and a second SRS resource set among the plurality of SRS resource sets, and each of the first SRS resource set and the second SRS resource set may correspond to TRPs 1 and 2, respectively. However, this is only an embodiment, and the configuration information related to the plurality of SRS resource sets may include information for configuring two or more SRS resource sets among the plurality of SRS resource sets.

The number of SRS resources configured in each SRS resource set may be different, but is not limited thereto. The configuration information related to the plurality of SRS resource sets may further include information for configuring the same number of SRS resources included in the first SRS resource set and the second SRS resource set.

In step S820, the UE may receive DCI indicating one or more of an SRS resource set or an SRS resource from the base station.

Specifically, the UE may receive DCI including information indicating at least one of the first SRS resource set, the second SRS resource set, or the first SRS resource set and the second SRS resource set, from the base station. In addition, the DCI may further include information indicating at least one SRS resource in each of the indicated one or more SRS resource sets.

Information indicating at least one SRS resource set and information indicating at least one SRS resource may be included in one or a plurality of fields in the DCI. For example, information indicating at least one SRS resource set and information indicating at least one SRS resource may be indicated by one field in DCI or may be indicated by a plurality of fields. In addition, information indicating at least one SRS resource in each of one or more SRS resource sets may be indicated by one field in the DCI or may be indicated by a plurality of fields.

At least one SRS resource in the first SRS resource set and/or the second SRS resource set may be indicated by the DCI. If the first and second SRS resource sets are indicated, the SRS resource instructions in each of the first SRS resource set and the second SRS resource set may be performed independently (or separately).

For example, when the DCI includes the first SRI field and the second SRI field, the first SRI field may indicate at least one SRS resource in the first SRS resource set, and the second SRI field may independently indicate at least one SRS resource in the second SRS resource set.

By independently performing the SRS resource indication in each SRS resource set, the degree of freedom to select a rank/precoder/beam of uplink transmission transmitted to each TRP is increased, and thus scheduling flexibility may be increased.

In addition, the number of SRS resources indicated in each SRS resource set by DCI may be the same. Accordingly, the rank of the first uplink transmission associated with the first SRS resource set and the rank of the second uplink transmission associated with the second SRS resource set may be the same. Here, the rank may mean the number of layers or the number of antenna ports. If all SRS resources (i.e., SRS resource candidates) included in each SRS resource set are 1-port SRS resources, the indicated number of SRS resources may correspond to a rank value, the number of layers, or the number of antenna ports.

That is, when the first SRS resource set and the second SRS resource set are indicated by DCI, at least one of the number of SRS resources indicated in the first SRS resource set, the number of layers of uplink transmission associated with the first SRS resource set, or the number of antenna ports of uplink transmission associated with the first SRS resource set, may be equal to at least one of the number of SRS resources indicated in the second SRS resource set, the number of layers of uplink transmission associated with the second SRS resource set, or the number of antenna ports of uplink transmission associated with the second SRS resource set.

In step S830, the UE may perform uplink transmission based on the indicated SRS resource.

When the first SRS resource set and the second SRS resource set are indicated by DCI, the UE may transmit uplink through TPR 1 corresponding to the first SRS resource set, and may perform uplink transmission through TRP 2 corresponding to the second SRS resource set. That is, when a plurality of SRS resource sets are indicated by DCI, the UE may perform an uplink transmission operation (i.e., an MTRP transmission operation) for each TRP based on the SRS resource indicated in the indicated SRS resource set.

For example, when M SRS resources are indicated in the first SRS resource set and M SRS resources are indicated in the second SRS resource set by DCI, the UE may transmit an uplink to TRP 1 based on the M SRS resources indicated in the first SRS resource set, and may transmit an uplink to TRP 2 based on the M SRS resources indicated in the second SRS resource set. Here, when all SRS resources (i.e., SRS resource candidates) included in the first and second SRS resource sets are 1-port SRS resources, the rank value, the number of layers, and the number of antenna ports of the uplink transmitted through TRP 1 and TRP 2 may be the same as M.

The UE may perform the first uplink transmission in at least one first transmission occasion (TO). And, the UE may perform the second uplink transmission in at least one second TO.

In addition, when the first SRS resource set is indicated by DCI and at least one SRS resource in the indicated first SRS resource set is indicated, the UE may transmit an uplink to TPR 1 based on at least one SRS resource indicated in the indicated first SRS resource set. And, when the second SRS resource set is indicated by DCI and at least one SRS resource in the indicated second SRS resource set is indicated, the UE may transmit an uplink in TPR 2 based on at least one SRS resource indicated in the indicated second SRS resource set. That is, when one SRS resource set is indicated by DCI, the UE may perform an STRP transmission operation based on the indicated one SRS resource set.

Hereinafter, a method for the base station to perform uplink reception based on one or more SRS resource sets among a plurality of SRS resource sets will be described with reference to FIG. 9.

Figure 9:
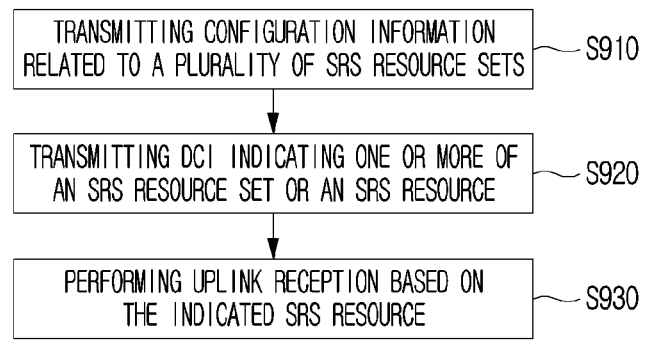
FIG. 9 is a diagram for describing an uplink reception method of a base station according to an embodiment of the present disclosure.

FIG. 9 is a flowchart illustrating an uplink reception method of a base station in a wireless communication system to which the present disclosure may be applied.

In step 910, the base station may transmit configuration information related to a plurality of SRS resource sets to the UE.

Configuration information related to a plurality of SRS resource sets may include information for configuring each usage of a plurality of SRS resource sets to a codebook, a non-codebook, or other uses (e.g., beam management, antenna switching, etc.) In addition, information related to the plurality of SRS resource sets may include information for configuring an SRS resource set to be used for uplink transmission among the plurality of SRS resource sets.

In addition, information for configuring the same number of SRS resources included in the first SRS resource set and the second SRS resource set according to the configuration information related to the plurality of SRS resource sets may be further included.

In step 920, the base station may transmit DCI indicating one or more of the SRS resource set or the SRS resource to the terminal.

Specifically, the base station may transmit the DCI including information indicating at least one of the first SRS resource set, the second SRS resource set, or the first SRS resource set and the second SRS resource set to the UE. In addition, the DCI may further include information indicating at least one SRS resource in each of the indicated one or more SRS resource sets. For example, information indicating one or more SRS resource sets and information indicating one or more SRS resources may be indicated by one field in DCI or may be indicated by a plurality of fields. In addition, information indicating one or more SRS resources in each of one or more SRS resource sets may be indicated by one field in DCI or may be indicated by a plurality of fields.

In addition, the number of SRS resources indicated in each SRS resource set by DCI may be the same. Accordingly, the rank of the first uplink transmission associated with the first SRS resource set and the rank of the second uplink transmission associated with the second SRS resource set may be the same. Here, the rank may mean the number of layers or the number of antenna ports. If all SRS resources (i.e., SRS resource candidates) included in each SRS resource set are 1-port SRS resources, the indicated number of SRS resources may correspond to a rank value, the number of layers, or the number of antenna ports.

In step 930, the base station may receive an uplink transmitted from the UE based on the indicated SRS resource.

When the first SRS resource set and the second SRS resource set are indicated through DCI, TRP 1 corresponding to the first SRS resource set and TRP 2 corresponding to the second SRS resource set may receive an uplink from the UE. Specifically, TRP 1 may performs an uplink reception operation based on at least one SRS resource indicated in the first SRS resource set, and TRP 2 may perform an uplink reception operation based on at least one SRS resource indicated in the second SRS resource set. That is, when a plurality of SRS resource sets are indicated by DCI, the plurality of TRPs may receive an uplink from the UE (i.e., MTRP reception operation) based on the SRS resources indicated in the indicated SRS resource set.

And, when the first SRS resource set is indicated through DCI and at least one SRS resource in the first SRS resource set is indicated, TRP 1 corresponding to the first SRS resource set may receive an uplink based on the SRS resource indicated in the first SRS resource set from the UE. And, when the second SRS resource set is indicated through DCI and at least one SRS resource in the second SRS resource set is indicated, TRP 2 corresponding to the second SRS resource set may receive an uplink based on the SRS resource indicated in the second SRS resource set from the UE. That is, when one SRS resource set is indicated by DCI, the TRP corresponding to the indicated SRS resource set may receive an uplink from the UE based on the SRS resource indicated in the indicated SRS resource set (i.e., STRP receive operation).

Hereinafter, specific examples of uplink transmission based on the configuration of a plurality of SRS resource sets according to the present disclosure will be described.

First, a method of indicating an SRS resource in one SRS resource set based on the configuration of one SRS resource set will be described.

Among methods of determining a precoder for uplink transmission (e.g., PUSCH transmission), in the case of a non-codebook-based method, N 1-port resources (e.g., N<5) in one SRS resource set may be configured for the UE. The UE may be indicated by one or more Lmax or less SRS resources in the SRS resource set through an SRS resource indicator (SRI) field of DCI.

Accordingly, the size of the SRI field may be determined as in Equation 3 below. In Equation 3, C(N,i) denotes the number of cases in which i out of N items are selected irrespective of the order.

$$\text{ceil}\left(\log 2\left(\sum_{i=1}^{Lmax} C(N, i)\right)\right) \quad \text{[Equation 3]}$$

The number of SRS resources indicated by the SRI field is the same as the PUSCH rank, and the UE may use a precoder/beamformer applied to the indicated SRS resource as a precoder/beamformer for PUSCH transmission.

When 'txConfig', which is a higher layer parameter, is 'nonCodebook', the number of bits of the SRI may be determined as in Equation 4 below.

$$\left\lceil \log_2\left(\sum_{k=1}^{\min\{L_{max}, N_{SRS}\}} \binom{N_{SRS}}{k}\right)\right\rceil \quad \text{[Equation 4]}$$

In Equation 4, $N_{SRS}$ is the number of SRS resources set in the SRS resource set configured by the upper layer parameter 'srs-ResourceSetToAddModList', and may be associated with 'nonCodebook', which is the value of the upper layer parameter 'usage'.

If the UE supports the operation using 'maxMIMO-Layers' and the upper layer parameter 'maxMIMO-Layers of PUSCH-ServingCellConfig' of the serving cell is set, Lmax may be determined by the corresponding parameter. Otherwise, Lmax may be determined by the maximum number of PUSCH layers supported by the UE for the serving cell for non-codebook-based operation.

When 'txConfig', which is a higher layer parameter, is 'Codebook', the number of bits of the SRI may be determined as in Equation 5 below.

$$\lceil \log_2(N_{SRS}) \rceil \quad \text{[Equation 5]}$$

In Equation 5, $N_{SRS}$ is the number of SRS resources set in the SRS resource set configured by the higher layer parameter 'srs-ResourceSetToAddModList', and may be associated with 'Codebook', which is the value of the upper layer parameter 'usage'.

When one SRS resource set is configured for the UE for uplink transmission (e.g., PUSCH transmission), only uplink transmission for STRP can be supported, so a plurality of SRS resource sets for uplink transmission for MTRP needs to be configured for the UE.

Hereinafter, specific examples of the present disclosure related to the configuration of a plurality of SRS resource sets will be described.

Embodiment 1

Since the uplink channel between the UE and each TRP is different in the MTRP PUSCH transmission method, it should be able to support an independent (e.g., different) precoder for PUSCH transmission for each TRP. That is, in the non-codebook-based transmission method, a method of indicating the precoder of the MTRP PUSCH is required.

Method 1 uses the existing non-codebook-based transmission method as it is, but indicates a precoder to be applied to a PUSCH directed to each TRP in DCI, respectively.

Specifically, if it is assumed that the PUSCH is transmitted with two TRPs, the SRI field of the DCI may be extended to two. If the PUSCH is transmitted with K TRPs, the number of SRI fields may be extended to K or less.

When the SRI field is extended to two, the size of each SRI field may be determined as and ceil(log $2(\Sigma_{i=1}^{Lmax0}C(N,i))$). Each SRI field may be used to indicate SRS resources of different SRS resource sets. For example, each of the SRS resource sets 0,1 may be configured for the precoder indication of TRP1,2, and each of the SRI fields 0,1 may select an SRS resource within the SRS resource set 0,1. That is, the SRS resource set for each TRP may be configured as shown in Table 7 below, and the SRI field size in DCI is increased to ceil(log $2(\Sigma_{j=1}^{Lmax1}C(M,j))$)+ceil(log $2(\Sigma_{i=1}^{Lmax0}C(N,i))$).

TABLE 7

| SRS resource Set 0 for TRP 0 | SRS resource Set 1 for TRP 1 |
|---|---|
| SRS resource 0 | SRS resource 0 |
| SRS resource 1 | SRS resource 1 |
| . . . | . . . |
| SRS resource N-1 | SRS resource M-1 |

According to method 1, each of the plurality of SRI fields may independently (or separately) indicate one SRS resource set and one or more SRS resources within the corresponding SRS resource set. Accordingly, flexibility of uplink transmission may be increased. On the other hand, signaling overhead (e.g., DCI payload) for scheduling of uplink transmission may increase. Method 2 is a method in which only one SRI field exists in DCI, as in the existing method, and the SRI value indicated in the SRI field is commonly applied to SRS resource sets 0, 1. In order to determine the SRI field size, after limiting Lmax 0 and Lmax 1 to be set to the same value, the SRI field size may be determined based on Lmax 0 or Lmax 1. Alternatively, when Lmax 0 and Lmax 1 are different, the SRI field size of DCI may be determined based on the minimum/maximum value among Lmax 0 and Lmax 1.

For example, when the SRI field whose size is determined in the above manner indicates the second SRS resource in the SRS resource set, by selecting the second SRS resource set in each of the SRS resource sets 0 and 1, a precoder may be applied to PUSCH TO of TRP 0 using the second SRS resource of SRS resource set 0, and a precoder may be applied to PUSCH TO of TRP 1 using the second SRS resource of SRS resource set 1. That is, there is a pairing between the SRS resource of TRP 0 and the SRS resource of TRP 1, and a specific pair may be indicated through the SRI field.

However, in the case of method 2, since the precoders of the two TRPs cannot be independently selected, it may not be possible to apply the optimized precoder to the uplink channel of each TRP. On the other hand, in the case of method 2, it may be to achieve the effect of reducing the signaling overhead for instructing a plurality of precoders (e.g., minimizing the increase in DCI payload).

Embodiment 2

This embodiment relates to a method of configuring an SRI field that jointly indicates SRS resources of a plurality of TRPs in order to indicate a precoder for non-codebook-based MTRP PUSCH transmission. That is, the present embodiment relates to a method of independently (or individually) selecting a plurality of SRS resource sets within one SRI field.

If N SRS resources are configured in SRS resource set 0, in order to determine the rank L0 precoder, there are cases in which L0 pieces are selected (regardless of the order) among the N SRS resources, and the rank must be selected with one of 1 or more and Lmax0 or less. In addition, when M SRS resources are configured in SRS resource set 1, in order to determine the rank L1 precoder, there are cases in which L1 pieces are selected (regardless of the order) among M SRS resources, and the rank must be selected with one value of 1 or more and Lmax1 or less. In this case, since SRS resources must be independently selected from within the two SRS resource sets, the SRI field size is determined as in Equation 6 below.

$$\text{ceil}(\log 2(\Sigma_i^{Lmax0} \Sigma_j^{Lmax1} C(N,i) * C(M,j))) \quad \text{[Equation 6]}$$

When configuring the joint SRI field in this way, although the DCI payload is larger than the method in which each of the two SRI fields sets the SRS resource in the SRS resource set, scheduling flexibility may be increased due to a high degree of freedom to select a rank/precoder/beamformer of uplink transmission (eg, PUSCH transmission) transmitted through TRP.

Additionally or alternatively, in order to further reduce the DCI payload, a specific transmission method (i.e., restriction) may be configured when indicating/selecting a resource in each of the SRS resource sets 0, 1. This limitation may be applied to an example of a joint SRI field, and may also be applied to an example of a plurality of SRI fields.

For example, in indicating at least one SRS resource of each of one or more SRS resource sets through at least one field in DCI, when a plurality of SRS resource sets are indicated, ranks in the plurality of SRS resource sets (or the number of indicated SRS resources when a 1-port SRS resource is assumed) may be limited to be the same.

In addition, in indicating at least one SRS resource of each of one or more SRS resource sets through at least one field in DCI, a used or unused SRS resource set among a plurality of preconfigured SRS resource sets may be indicated. Alternatively, the number of SRS resource sets used (or the number of TRPs) or the number of unused SRS resource sets among a plurality of preconfigured SRS resource sets may be indicated through one or more fields in DCI.

More specific examples of this are as follows.

The first transmission method (ie, the first restriction method) is a method in which the rank value of the PUSCH transmitted in each TRP is equally set/restricted. That is, the same number of SRS resources may be indicated/selected in each of SRS resource set 0 and SRS resource set 1, and may be configured/limited as in Equation 7 below.

$$\text{Set } A = \{(i,j) | (i,j) = (1,1),(2,2), \ldots ,(\min(Lmax0, Lmax1), \min(Lmax0,Lmax1))\} \quad \text{[Equation 7]}$$

When the rank of the PUSCH transmitted through each TRP is equally limited as in the first transmission method, the size of the SRI field(s) decreases as the (i, j) combination is limited to set A. In the case of non-codebook-based MTRP PUSCH transmission, the base station and the UE may reduce DCI overhead by applying the first transmission method.

The second transmission method (i.e., the second restriction method) is a method of configuring/limiting the rank of TRP 1 to 0. That is, the second transmission method is a method in which PUSCH transmission is not performed to TRP0 by not indicating/selecting SRS resources in SRS resource set 0, and PUSCH transmission is performed only to TRP 1 by indicating/selecting SRS resources in SRS resource set 1. The second transmission method may be configured/limited as in Equation 8 below.

$$\text{set } B = \{(i,j) | (i,j) = (0,1),(0,2), \ldots ,(0,Lmax1)\} \quad \text{[Equation 8]}$$

The third transmission method (ie, the third restriction method) is a method of setting/limiting the rank of TRP 0 to 0. That is, the third transmission method is a method of performing PUSCH transmission only with TRP 0 by indicating/selecting SRS resources in SRS resource set 0 without performing PUSCH transmission in TRP1 by not indicating/selecting SRS resources in SRS resource set 1. The third transmission method may be configured/limited as in Equation 9 below.

$$\text{set } C = \{(i,j) | (i,j) = (1,0),(2,0), \ldots ,(Lmax0,0)\} \quad \text{[Equation 9]}$$

The second transmission method or the third transmission method is a method in which the PUSCH is transmitted in a specific TRP and the PUSCH is not transmitted by limiting/configuring the rank to 0 for the remaining TRPs. For example, a specific TRP through which PUSCH is transmitted may be dynamically indicated/determined based on channel quality. Or, for example, based on the index (e.g., CORESETpoolindex, etc.) associated with each TRP, the TRP corresponding to the minimum/maximum index may be selected. For example, when j=0, a TRP corresponding to the control resource set (CORESET) pool index 0 is selected, and a PUSCH transmission operation may be performed according to an uplink power control parameter of the corresponding TRP, a pathloss (PL) reference signal, a spatial relation reference signal, a QCL reference signal, and the like. Also, when i=0, a TRP corresponding to CORESETpoolindex 1 is selected, and a PUSCH transmission operation may be performed according to an uplink power control parameter of the corresponding TRP, a path loss reference signal, a space-related reference signal, a QCL reference signal, and the like. Alternatively, apart from CORESETpoolindex, an uplink power control parameter, pathloss reference signal, spatial relation reference signal, QCL reference signal, etc. to be used when j=0 and uplink power control parameter, path loss reference signal, spatial relation reference signal, QCL reference signal, etc. to be used when i=0 may be configured separately.

The base station may select at least one of the transmission methods (or limited methods) and instruct the UE. However, when the transmission method is dynamically indicated, the size of the DCI may be dynamically changed. As a result, the number of PDCCH blind detections by the UE increases, and accordingly, the implementation complexity of the UE may increase. Accordingly, the indication of the transmission method may be semi-statically indicated through RRC/MAC-CE signaling or the like.

For example, the base station may indicate A or B or C or A∪B or A∪C or B∪C or A∪B∪C. Here, it is assumed that A corresponds to the above-described first transmission method, B corresponds to the above-described second transmission method, and C corresponds to the above-described third transmission method, respectively.

When A is indicated, the UE may perform an MTRP PUSCH transmission operation in a state where rank restriction is applied.

When B or C is indicated, the UE may perform the existing STRP PUSCH transmission operation.

When A∪B or A∪C is indicated, STRP and MTRP PUSCH may be dynamically switched through the SRI field.

When B∪C is indicated, it is limited to STRP PUSCH, but it may be possible to dynamically select a reception point (point selection). That is, similar to the downlink point selection, by dynamically selecting the received TRP according to the channel condition in the uplink, the uplink transmission operation may be performed.

When A∪B∪C is indicated, the STRP PUSCH and the MTRP PUSCH may be dynamically switched (dynamic switching), and the received TRP of the STRP PUSCH may be dynamically indicated. For example, whether the uplink transmission is for STRP or MTRP (or the number of TRPs or the number of SRS resource sets) may be dynamically indicated through one or more fields in DCI. In addition, through one or more fields in DCI, uplink transmission to which one or more TRPs (or based on one or more SRS resource sets) may be dynamically indicated. In addition, through one or more fields in DCI, it may be dynamically indicated on which beam (or which SRS resource) uplink transmission is performed with one or more indicated TRPs (or, among the indicated one or more SRS resource sets).

For simpler signaling, the UE may additionally expect the base station to configure N=M and/or Lmax0=Lmax1.

And, the base station may freely define each codepoint of the SRI field as an SRS resource for one SRS resource set or an SRS resource for a plurality of SRS resource sets through RRC/MAC-CE signaling. For example, it may be configured as shown in Table 8 below for 4 code points that may be configured as a 2-bit SRI field.

TABLE 8

| codepoint | SRS resource set and SRI | Operation |
|---|---|---|
| 00 | SRI = 0 for SRS set 0, no SRI for SRS set 1 | Transmit only to TRP 0 with the beam of the SRS resource indicated by SRI = 0 of set0 |
| 001 | no SRI for SRS set 0, SRI = 0 for SRS set 1 | Transmit only to TRP 1 with the beam of the SRS resource indicated by SRI = 0 of set1 |
| 10 | SRI = 0 for SRS set 0, SRI = 0 for SRS set 1 | MTRP PUSCH transmission to multiple PUSCH TOs alternately with two beams |

TABLE 8-continued

| codepoint | SRS resource set and SRI | Operation |
|---|---|---|
| 11 | SRI = 0 for SRS set 0, SRI = 1 for SRS set 1 | MTRP PUSCH transmission to multiple PUSCH TOs alternately with two beams |

When a codepoint (e.g., codepoint 00 or 01) in which an SRS resource is configured for one SRS resource set is indicated, STRP transmission may be performed by precoder/beamforming of the corresponding SRS. When a codepoint (e.g., codepoint 10 or 11) in which SRS resources are configured for two (or two or more) SRS resource sets is indicated, the precoder/beamforming of the corresponding SRS alternates to multiple PUSCH TOs. MTRP transmission may be performed by being applied while moving. In the example disclosed in Table 8, it is assumed that a maximum of two SRS resources are indicated for convenience of explanation, but N SRS resources may be indicated. In this case, N precoders/beamforming may be alternately applied to N or N or more PUSCH TOs. The above-described method may be equally applied even when the UL TCI field is introduced instead of the SRI field (applicable to both the codebook-based method and the non-codebook-based method). Whether STRP UL transmission or MTRP UL transmission may be determined according to whether there is one or a plurality of SRS resource sets, SRS resources, or spatial relation RSs indicated in each UL TCI codepoint. For example, in the case of MTRP UL transmission (e.g., when a plurality of SRS resource set/SRS resource/space related RSs are indicated based on each UL TCI codepoint), precoders/beams of a plurality of indicated SRS/spatial-related RSs may be alternately applied to a plurality of PUSCH TOs to perform an MTRP UL transmission operation.

Embodiment 3

This embodiment relates to a method of configuring SRI field(s) for indicating a precoder of codebook-based PUSCH transmission.

In the case of the existing codebook-based PUSCH transmission method, a rank/precoding matrix indicator (PMI) is indicated through a transport precoding matrix indicator (TPMI) field of DCI. In addition, one of 2(/4) SRS resources defined in one SRS resource set is selected through the 1 (/2) bit SRI field of DCI. In addition, the UE may perform UL PUSCH transmission by applying the PMI indicated through the TPMI field to ports of the selected SRS resource. A specific uplink beam (e.g., an analog beam) is equally applied to the ports of the SRS resource. In this way, the UE may generate a final precoder by applying PMI to ports to which a specific uplink beam is applied. Since the uplink channel between the UE and each TRP is different in the MTRP PUSCH transmission method, an independent (e.g., different) precoder and SRS resource indication scheme for PUSCH transmission for each TRP are required.

The base station may distinguish the precoder to be used for the PUSCH TO of TRP 0 and the precoder to be used for the PUSCH TO of TRP 1 to the UE through an arbitrary precoder instruction method and may instruct the UE. Hereinafter, specific examples for indicating the SRS resource to be applied in the PUSCH TO of each TRP will be described.

As a first method, the SRI field may be extended to a plurality (e.g., two). For example, the first SRI field may be used to indicate the SRS resource to be applied in PUSCH TO of TRP 0 in SRS resource set 0, and the second SRI field may be used to indicate an SRS resource to be applied in PUSCH TO of TRP 1 in SRS resource set 1. Accordingly, flexibility of uplink transmission may be increased. On the other hand, signaling overhead (e.g., DCI payload) for scheduling of uplink transmission may increase.

As a second method, only one SRI field exists (e.g., the same size) as in the existing method, but the SRI value indicated by the SRI field may be commonly applied to SRS resource set 0 and SRS resource set 1. That is, when the SRI value is 0, the first SRS resource is selected from each of SRS resource set 0 and SRS resource set 1, and when the SRI value is 1, the second SRS resource from each of SRS resource set 0 and SRS resource set 1 may be chosen. That is, there is a pairing between the SRS resource of TRP 0 and the SRS resource of TRP 1, and a specific pair may be indicated through the SRI field. However, in the case of the second method, since the SRS resource for PUSCH transmission of each TRP cannot be independently indicated/selected, precoder/beamforming optimized for the uplink channel of each TRP cannot be applied. On the other hand, in the case of method 2, it may be to achieve the effect of reducing the signaling overhead for instructing a plurality of precoders (e.g., minimizing the increase in DCI payload).

As a third method, there is only one SRI field (with the same size) as in the existing method, but one SRS resource may be selected from one SRS resource set through the indicated 1-bit SRI value. Two SRS resources exist in the SRS resource set, the selected SRS resource may be applied to the PUSCH TO of TRP 0, and the unselected SRS resource may be applied to the PUSCH TO of TRP 1. Alternatively, the selected SRS resource may be applied to the PUSCH TO of TRP 1, and the unselected SRS resource may be applied to the PUSCH TO of TRP 0.

As a fourth method, there is only one SRI field as in the existing method, but one SRS resource may be selected from one SRS resource set through the indicated n-bit SRI value. The UE may assume that the SRS resource set is indicated by the remaining SRS resources except for the selected SRS resource. That is, the remaining SRS resources except for the SRS resource selected as the SRI may be sequentially applied to the PUSCH TO in a circular manner. For example, 4 SRS resources 0, 1, 2, 3 are configured in the SRS resource set, and when SRS resource 0 is selected through the SRI field, SRS resource 0 is not applied to PUSCH TO, and unselected SRS resources 1, 2, and 3 may be alternately applied to PUSCH TO in order.

As a fifth method, there is only one SRI field as in the existing method, but one SRS resource may be selected from one SRS resource set through the indicated n-bit SRI value. A plurality of PUSCH TOs configured for MTRP PUSCH transmission may be divided into a primary PUSCH TO and a secondary PUSCH TO. In the primary PUSCH TO, non-codebook-based precoding may be performed using the SRS resource indicated by the SRI. In the secondary PUSCH TO, precoding may be performed by sequentially applying the remaining SRS resources except for the SRS indicated by the SRI among the SRSs that may be indicated by the SRI in a circular manner. For example, if four SRS resources 0, 1, 2, 3 are configured in the SRS resource set and SRS resource 0 is selected through the SRI field, non-codebook-based precoding using resource 0 in the primary PUSCH TO is performed, and in the secondary PUSCH TO, precoding may be performed using unselected SRS resources 1, 2, 3 in a cyclic manner in order (e.g., 1, 2, 3, 1, 2, . . . ).

And, for example, the primary TO may be defined as a TO of TRP 0 and the secondary TO may be defined as a TO of TRP 1, and the rank value (e.g., rank 1) indicated for the primary TO may also be applied to the secondary TO. In this case, the SRS resource to be used for generating the precoder in the secondary TO may be determined as a combination that can be generated by selecting one of the SRS resources not indicated by the SRI field. For example, it is assumed that 4 SRS resources are configured for one SRS resource set, and rank 2 is indicated by selecting SRS resources 0 and 1 through the SRI field. In this case, a precoder may be generated using SRS resources 0 and 1 in the primary TO, and a rank 2 precoder may be generated in the secondary TO by using SRS resources 2 and 3. When configuring a primary TO and a secondary TO among multiple PUSCH TOs, the base station may select one of at least one pattern and instruct the UE.

Embodiment 4

This embodiment relates to a method of selecting an SRS resource for MTRP PUSCH transmission. In this specification, it is assumed that a plurality of SRS resource sets defined in Rel-15/16 are configured to distinguish SRS resources used in each TRP, and SRS resources in each SRS resource set are used in the same TRP. In another method, SRS group 0 and SRS group 1 grouped for each SRS resource used by each TRP in one SRS resource set may be configured for the UE. At this time, SRS resource set 0 and SRS resource set 1 used in each TRP described in this specification may be replaced with SRS group 0 and SRS group 1, respectively. That is, a plurality of SRS resource groups (or SRS resource subsets) may exist in one SRS resource set, and each group (or subset) may correspond to a different TRP. In this case, since both SRS resources for two different TRPs exist in the SRS resource set, the base station may configure different associated CSI-RSs for SRS resources defined in the same set.

According to the current Rel-16 NR specification, there is one associated CSI-RS in the SRS resource set. Accordingly, all SRS resources in the SRS resource set are associated with the same CSI-RS. That is, the associated CSI-RS may be indicated/configured as 'ID of CSI-RS resource associated with this SRS resource set in non-codebook based operation'.

In order to remove the above limitation, in this embodiment, N associated CSI-RSs corresponding to N (e.g., N=2) TRPs in the SRS resource set may be configured. For example, N associated CSI-RSs in the SRS resource set may be configured. And, it may be 1:1 association with N SRS groups in the SRS resource set. For example, as the associated CSI-RS ID and the SRS group/subset are paired, a plurality of pairs may be configured/indicated.

In this case, if m SRS resources indicated by the base station through DCI (one or more SRI fields) are associated with the same associated CSI-RS, PUSCH transmission may be performed toward a single TRP in rank m. In addition, m1 SRS resources out of m may be related to the same associated CSI-RS, and the remaining m2 SRS resources may be related to another identically related CSI-RS. In this case, the UE may perform MTRP PUSCH transmission in which a plurality of PUSCH TOs are transmitted toward TRP 1 with rank m1 and PUSCH transmission toward TRP 2 with rank m2.

For example, SRS resource #0, 1, 2, 3 may be connected to the associated CSI-RS resource #0, SRS resource #4, 5, 6, 7 may be connected to the associated CSI-RS resource #1, SRS resources #0, 1, 2, 3, 5, 6, 7, 8 defined in one SRS resource set may be implicitly divided into TRPs, and a rank and a precoder to be applied to each TO may be determined with the SRS indicated through the SRI field(s) and the associated CSI-RS of the SRS. If the SRI indicated by DCI is 0, 2, 5, in the odd-numbered TOs, the UE may perform an uplink transmission operation in rank2 using SRI=0, 2 belonging to the associated CSI-RS resource #0, and in the even-numbered TOs, the UE may perform an uplink transmission operation in rank1 using SRI=5 belonging to the associated CSI-RS resource #1.

Embodiment 5

This embodiment relates to a method of applying an optimal SRI field for MTRP PUSCH (repeated) transmission.

Two SRI fields may be introduced for MTRP PUSCH (repeated) transmission. The first SRI field may indicate the SRS resource of SRS resource set 0, and the PUSCH may be transmitted after being optimized for the uplink channel of TRP 1 by indicating a power control parameter (e.g., pathloss reference signal, closed loop index, PO value, alpha) for TRP 1 defined through an RRC signal to each code point. The second SRI field may indicate the SRS resource of SRS resource set 1, and the PUSCH may be transmitted after being optimized for the uplink channel of TRP 2 by indicating the power control parameters (e.g., pathloss reference signal, closed loop index, PO value, alpha) for TRP 2 defined through the RRC signal to each code point.

Embodiment 5-1

This embodiment relates to a method of reducing the SRI field size by utilizing the same rank restriction in non-codebook-based PUSCH transmission.

In the existing non-codebook-based PUSCH transmission scheme, the PUSCH rank may be indicated through the SRI field. When transmitting MTRP PUSCH, based on limiting the PUSCH rank directed to each TRP to the same rank, the first SRI field may indicate rank information in the same way as before, but a method of reducing the field size by excluding the rank information in the second SRI field is under standardization discussion.

For example, if Lmax=2 and two SRS resources are configured in each SRS resource set, the first SRI field may indicate SRS resource 0 or 1 for rank 1 PUSCH in SRS resource set 0, or for rank 2 PUSCH SRS resources 0 and 1 may be indicated. As a result, a total of three code points is used, and code points 0, 1, and 2 may indicate SRS resource 0, SRS resource 1, and SRS resource 0 and 1, respectively, and the first SRI field size is 2 bits. And since code point 3 is not used, it is reserved. The second SRI field should indicate SRS resource 0 or 1 of SRS resource set 1 when the first SRI field indicates rank 1, and SRS of SRS resource set 1 when the first SRI field indicates rank 2 Resources 0 and 1 should be indicated. Accordingly, the second SRI field size may be determined as the maximum number of codepoints among codepoints required for each rank. In the above example, since the number of code points required for rank 1 is 2 and the number of code points required for rank 2 is 1, the size of the second SRI field is 1 bit.

Embodiment 5-2

When two SRI fields are introduced, standardization is being discussed for a method of signaling (signaling) of dynamic switching between MTRP/STRP PUSCH repeated transmissions. For example, a method of using a reserved codepoint for each SRI field (in addition to a reserved codepoint if there is no reserved codepoint) may be discussed. When the reserved codepoint is indicated, the corresponding SRI field is not used, and as a result, since PUSCH transmission is not performed in the TRP corresponding to the corresponding SRI field (e.g., TRP 2 when the second SRI field is indicated as the reserved codepoint), repeated STRP PUSCH transmission may be performed.

Embodiment 5-3

This embodiment relates to a method for reducing the SRI field size by utilizing the same rank restriction (Embodiment 5-1) and enabling dynamic switching (Embodiment 5-2) between MTRP PUSCH, TRP 1 (STRP) PUSCH, and TRP 2 (STRP) PUSCH.

When the SRI field size reduction using the same rank restriction described in Embodiment 5-1 and the STRP/MTRP dynamic switching scheme using the reserved code point described in Embodiment 4-2 are used simultaneously, the following problems may occur. Since the second SRI field is defined using the rank value indicated by the first SRI field, if PUSCH transmission of TRP 1 is disabled using the codepoint reserved in the first field, the rank of the second field The value cannot be determined. Conversely, even if PUSCH transmission of TRP 2 is disabled using the reserved codepoint in the second field, there is no problem in determining the rank value of the first SRI field, so it may operate without a problem. As a result, it is possible to transmit the STRP PUSCH to TRP 1 using the reserved code point of the second SRI field, but it is impossible to transmit the STRP PUSCH to TRP 2 using the reserved code point of the first SRI field. Accordingly, dynamic switching of the MTRP PUSCH and the TRP 1 PUSCH may be possible, but the dynamic switching of the MTRP PUSCH and the TRP 2 PUSCH may not be possible.

In order to solve the above-mentioned problem, using two reserved codepoints in the second SRI field (add a reserved codepoint if it does not exist), the first reserved codepoint is used for indicating TRP 1 PUSCH transmission, and the second reserved codepoint may be used for indicating TRP 2 PUSCH transmission. Specifically, when TRP 1 PUSCH is indicated through this, the first SRI field indicates an SRS resource in SRS resource set 0, and a value defined (mapped) in the first SRI field may also be applied to the PC parameter. On the other hand, when TRP 2 PUSCH is indicated, the first SRI field indicates the SRS resource in SRS resource set 1 instead of the previously defined SRS resource set 0, and indicates the PC parameter defined (mapped) in the second SRI field instead of the previously defined PC parameter. That is, in the existing method, the first SRI field may be used for indicating the SRS resource of SRS resource set 0 and for indicating the PC parameter for TRP 1, but in the proposed method of this embodiment, the first SRI field may be used for indicating the SRS resource of SRS resource set 1 and for indicating the PC parameter for TRP 2 according to the value indicated by the second SRI field.

In the above proposal, the TRP 1 PUSCH indication and the TRP 2 PUSCH indication are indicated through the second SRI field, but the present disclosure is not limited thereto, and the TRP 1 PUSCH indication and the TRP 2 PUSCH indication may be indicated through various DCI fields. For example, a new field may be introduced in DCI for the above operation, or if there is a reserved codepoint of another existing DCI field (e.g., DMRS port indication), it may be indicated by utilizing it.

Additionally or alternatively, in the above embodiment, when a reserved codepoint is used for TRP selection, the reserved codepoint may be added/defined as a TRP selection codepoint rather than a reserved codepoint. Even when there is no reserved code point in the existing field, the TRP selection code point may be added/defined in the corresponding field for TRP selection to perform the above operation.

And, while explaining this embodiment, in the second SRI field excluding the rank information and using the reserved code point to instruct TRP selection, accordingly, a method for determining whether to map the first SRI field to the SRS resource set and PC parameter of TRP 1 or to the SRS resource set and PC parameter of TRP 2 has been described. In the present disclosure, even if the proposals applied to the second SRI field are applied to the first SRI field and the proposals applied to the first SRI field are applied to the second SRI field, the same effect to be achieved in the above embodiment may be expected.

Embodiment 5-4

Whether MTRP or STRP may be indicated with 1 bit through a new field defined in DCI rather than the SRI field for MTRP/STRP dynamic switching. When MTRP is indicated, the first and second SRI fields may be used for indicating SRS resources and PC parameters of TRP 1 and TRP 2, respectively. When STRP is indicated through a new field, the second SRI field may not be used for indicating SRS resources and PC parameters, but may be used for indicating either TRP 1 or TRP 2. When TRP 1 is indicated through the second SRI field, the SRS resource (i.e., SRS resources in SRS resource set 0) and PC parameter (i.e., the PC parameter mapped to the first SRI field through RRC) of TRP 1 may be indicated by using the first SRI field. And, when TRP 2 is indicated, the SRS resource of TRP 2 (i.e., the SRS resource in the second SRS resource set) and the PC parameter (i.e., the PC mapped to the second SRI field through RRC using the first SRI field) parameters) may be indicated.

In the above embodiment, the number of SRS resources configured in each SRS resource set may be different. However, if the number of resources of SRS resource set 1 is greater than the number of SRS resources of SRS resource set 0, when the resource of SRS resource set 1 is indicated through the first SRI field, all SRS resource combinations cannot be indicated because the code point of the SRI field is insufficient, and only some resource combinations may be indicated. In order to prevent this problem, the UE may expect that the number of SRS resources in each SRS resource set is always configured to be the same.

Figure 10:
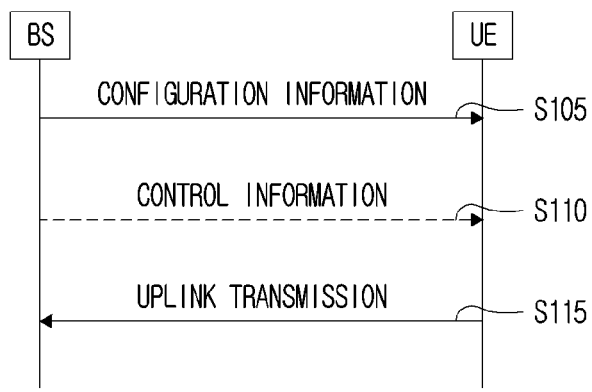
FIG. 10 is a diagram for describing a signaling procedure of a network side and a terminal according to the present disclosure.

FIG. 10 is a diagram for describing a signaling procedure of the network side and the UE according to the present disclosure.

FIG. 10 represents an example of signaling between UE and a network side to which the above-described examples of the present disclosure (e.g., embodiment 1/embodiment 2/embodiment 3/embodiment 4/embodiment 5-1/embodiment 5-2/embodiment 5-3/embodiment 5-4, etc.) may be applied. Here, UE/a network side is illustrative and may be applied by being substituted with a variety of devices as described by referring to FIG. 11. FIG. 10 is for convenience of description, and it does not limit a scope of the present disclosure. In addition, some step(s) shown in FIG. 10 may be omitted according to a situation and/or a configuration, etc. In addition, the above-described uplink transmission and reception operation, a MTRP-related operation, etc. may be referred to or used for an operation of a network side/UE in FIG. 10.

In the following description, a network side may be one base station including a plurality of TRPs or may be one cell including a plurality of TRPs. Alternatively, a network side may include a plurality of RRHs (remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID). In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

UE may receive configuration information through/by using TRP1 and/or TRP2 from a network side S105. The configuration information may include system information (SI), scheduling information, CSI related configuration (e.g., CSI reporting configuration, CSI-RS resource configuration), etc. The configuration information may include information related to a configuration of a network side (i.e., a TRP configuration), resource allocation information related to MTRP based transmission and reception, etc. The configuration information may be transmitted through higher layer (e.g., RRC, MAC CE). In addition, when the configuration information is predefined or preconfigured, a corresponding stage may be omitted.

For example, as in the above-described proposed methods, the configuration information may include one or more of SRS-related configuration (e.g., SRSresourceset/SRSresource etc.), TO-related configuration/configuration information (e.g., the number of TO/resource information constituting TO, etc.), PUSCH repeated transmission-related configuration, and rank information for each TO. For example, the configuration information may include reference signal (e.g., CSI-RS) related information for spatially related/beamformer/precoder configuration of SRS.

For example, an operation that UE (100 or 200 in FIG. 11) in the above-described stage S105 receives the configuration information from a network side (200 or 100 in FIG. 11) may be implemented by a device in FIG. 11 which will be described after. For example, in reference to FIG. 11, at least one processor 102 may control at least one transceiver 106 and/or at least one memory 104, etc. to receive the configuration information and at least one transceiver 106 may receive the configuration information from a network side.

UE may transmit a reference signal for UL transmission through/by using TRP1 and/or TRP2 to a network side S110. For example, the reference signal may be transmitted based on the configuration information and in an example, the reference signal may be a SRS. For example, another reference signal (e.g., a CSI-RS) associated with a spatial relation/beamformer/precoder which will be applied to the reference signal may be configured based on the configuration information and the reference signal (e.g., a SRS) may be transmitted based on a spatial relation/beamformer/precoder of the another reference signal (e.g., a CSI-RS).

If UE directly obtains a spatial parameter for uplink transmission based on a DL RS resource from a network side, a stage for reference signal transmission (e.g., a SRS) in stage S110 may be omitted. Accordingly, an association between a DL RS resource and a SRS resource may not be configured or defined for UE.

For example, an operation that UE (100 or 200 in FIG. 11) in the above-described stage S110 transmits the reference signal to a network side (200 or 100 in FIG. 11) may be implemented by a device in FIG. 11 which will be described after. For example, in reference to FIG. 11, at least one processor 102 may control at least one transceiver 106 and/or at least one memory 104, etc. to transmit the reference signal and at least one transceiver 106 may transmit the reference signal to a network side.

UE may receive control information from a network side S115. In an example, the control information may include scheduling information/UL grant for transmission of an UL channel (e.g., a PUCCH/a PUSCH)/an UL signal (e.g., a SRS). For example, the control information may include information on at least one of TCI state(s), QCL RS(s), DMRS port(s). The control information may be received through a control channel (e.g., a PDCCH). In an example, the control information may be DCI. In an example, control information may be configured according to DCI format 0-1 or DCI format 0-0.

For example, the UE may receive DCI indicating at least one of the first SRS resource set, the second SRS resource set, or the first SRS resource set and the second SRS resource set. For example, the UE may receive the DCI indicating at least one SRS resource in the indicated at least one SRS resource set.

For example, an operation that UE (100 or 200 in FIG. 11) in the above-described stage S115 receives the control information from a network side (200 or 100 in FIG. 11) may be implemented by a device in FIG. 11 which will be described after. For example, in reference to FIG. 11, at least one processor 102 may control at least one transceiver 106 and/or at least one memory 104, etc. to receive the control information and at least one transceiver 106 may receive the control information from a network side.

UE may perform uplink transmission (e.g., UL data/signal transmission) through/by using TRP1 and/or TRP2 to a network side S120. For example, UL data/signal may be transmitted through an UL channel (e.g., a PUCCH/a PUSCH). For example, the UL data/signal may be transmitted based on the above-described suggestions (e.g., embodiment 1, embodiment 2, or a combination of at least one of detailed examples thereof).

For example, an operation that UE (100 or 200 in FIG. 11) in the above-described stage S120 transmits the UL data/signal to a network side (200 or 100 in FIG. 11) may be implemented by a device in FIG. 11 which will be described after. For example, in reference to FIG. 11, at least one processor 102 may control at least one transceiver 106 and/or at least one memory 104, etc. to transmit the UL data/signal and at least one transceiver 106 may transmit the UL data/signal to a network side.

As described above, the above-described network side/ UE operation (e.g., embodiment 1, embodiment 2, or a combination of at least one of detailed examples thereof) may be implemented by a device (e.g., a device in FIG. 10) which will be described after. For example, UE may correspond to a first wireless device and a network side may correspond to a second wireless device, and in some cases, the opposite may be considered.

Figure 11:
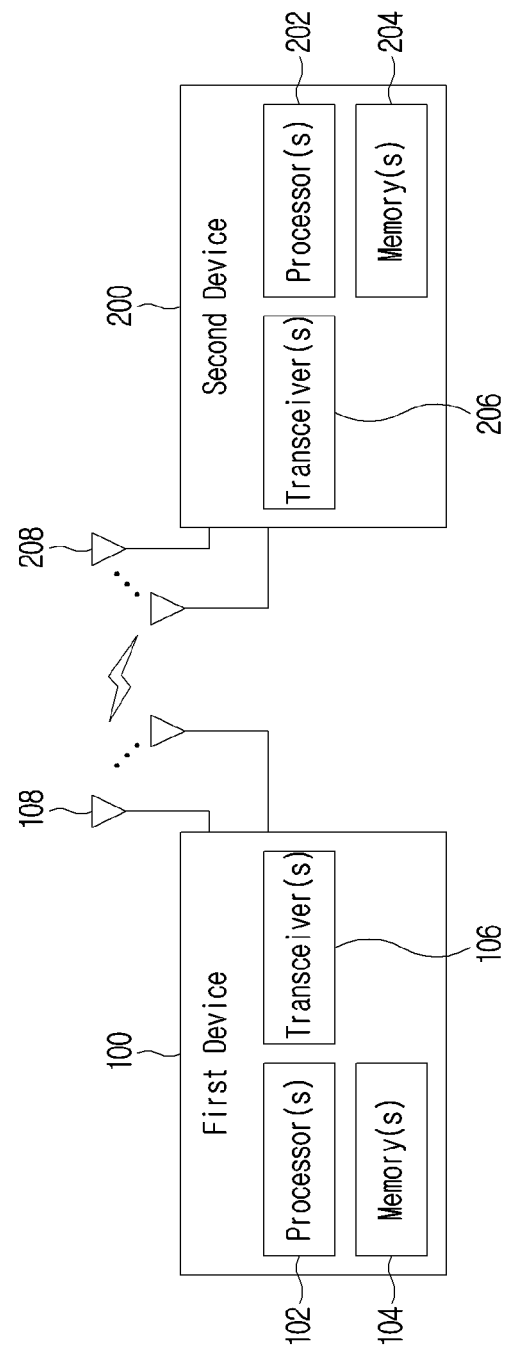
FIG. 11 illustrates a block diagram of a wireless communication system according to an embodiment of the present disclosure.

For example, the above-described network side/UE operation (e.g., embodiment 1, embodiment 2, or a combination of at least one of detailed examples thereof) may be processed by at least one processor in FIG. 11 (e.g., 102, 202) and the above-described network side/UE operation (e.g., embodiment 1, embodiment 2, or a combination of at least one of detailed examples thereof) may be stored in a memory (e.g., at least one memory in FIG. 11 (e.g., 104, 204)) in a command/program form (e.g., an instruction, an executable code) for driving at least one processor in FIG. 11 (e.g., 102, 202).

General Device to which the Present Disclosure May be Applied

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a user equipment (UE) from a base station, configuration information related to a plurality of sounding reference signal (SRS) resource sets;
receiving, by the UE from the base station, downlink control information (DCI) including first information related to one of a first SRS resource set, a second SRS resource set, or the first SRS resource set and the second SRS resource set; and
performing uplink repetition transmission across K consecutive slots based on the first information,
wherein a number of SRS resources included in the first SRS resource set and the second SRS resource set are same, and
wherein, based on the first SRS resource set and the second SRS resource set being related to the first information and the K being 2, the first SRS resource set is applied to a first slot of the K consecutive slots and the second SRS resource set is applied to a second slot of the K consecutive slots.

2. The method of claim 1, wherein:
based on the first SRS resource set and the second SRS resource set being related to the first information, a number of layers of first uplink repetition transmission associated with the first SRS resource set and a number of layers of second uplink repetition transmission associated with the second SRS resource set are same.

3. The method of claim 2, wherein:
one SRS port is configured for each of at least one SRS resource in the first SRS resource set and the second SRS resource set.

4. The method of claim 2, wherein:
the first uplink repetition transmission associated with the first SRS resource set and the second uplink repetition transmission associated with the second SRS resource set are in different slots of the K consecutive slots.

5. The method of claim 1, wherein:
based on the first SRS resource set being related to the first information or the second SRS resource set being not related to first information, the uplink repetition transmission is performed across the K consecutive slots based on at least one SRS resource indicated among the first SRS resource set.

6. The method of claim 1, wherein:

based on the second SRS resource set being related to the first information or the first SRS resource set being not related to the first information, the uplink repetition transmission is performed across the K consecutive slots based on at least one SRS resource among the second SRS resource set.

7. The method of claim 1, wherein:

the first SRS resource set corresponds to a first associated non-zero power (NZP) channel state information-reference signal (CSI-RS) resource, and the second SRS resource set corresponds to a second associated NZP CSI-RS resource.

8. The method of claim 1, wherein:

the uplink repetition transmission is a non-codebook-based transmission or a codebook-based transmission.

9. The method of claim 1, wherein:

the DCI includes second information related to at least one SRS resource in at least one SRS resource set related to the first information, and the first information and the second information are indicated by different fields included in the DCI.

10. The method of claim 9, wherein:

the second information is indicated by a first field and a second field, the first field indicates at least one SRS resource among the first SRS resource set, and the second field indicates at least one SRS resource among the second SRS resource set.

11. The method of claim 1, wherein:

the uplink repetition transmission includes a physical uplink shared channel (PUSCH) repetition transmission.

12. A user equipment (UE) comprising:

at least one transceiver; and at least one processor connected to the at least one transceiver, wherein the processor is configured to:

receive, from a base station through the at least one transceiver, configuration information related to a plurality of sounding reference signal (SRS) resource sets;

receive, from the base station through the at least one transceiver, downlink control information (DCI) including first information related to one of a first SRS resource set, a second SRS resource set, or the first SRS resource set and the second SRS resource set; and perform uplink repetition transmission across K consecutive slots based on the first information, wherein a number of SRS resources included in the first SRS resource set and the second SRS resource set are same, and wherein, based on the first SRS resource set and the second SRS resource set being related to the first information and the K being 2, the first SRS resource set is applied to a first slot of the K consecutive slots and the second SRS resource set is applied to a second slot of the K consecutive slots.

13. A method comprising:

transmitting, by a base station to a user equipment (UE), configuration information related to a plurality of sounding reference signal (SRS) resource sets;

transmitting, by the base station to the UE, downlink control information (DCI) including first information related to one of a first SRS resource set, a second SRS resource set, or the first SRS resource set and the second SRS resource set; and performing uplink repetition reception transmitted across K consecutive slots based on the first information, wherein a number of SRS resources included in the first SRS resource set and the second SRS resource set are same, and wherein, based on the first SRS resource set and the second SRS resource set being related to the first information and the K being 2, the first SRS resource set is applied to a first slot of the K consecutive slots and the second SRS resource set is applied to a second slot of the K consecutive slots.

* * * * *